(12) United States Patent
Obara et al.

(10) Patent No.: US 6,373,219 B1
(45) Date of Patent: Apr. 16, 2002

(54) MOTOR CONTROL SYSTEM AND MOTOR CONTROL METHOD

(75) Inventors: Sanshiro Obara, Tokai-mura; Hiroshi Katayama, Hitachinaka; Yasuo Morooka, Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/598,963

(22) Filed: Jun. 22, 2000

(30) Foreign Application Priority Data

Jun. 22, 1999 (JP) .......................................... 11-175640

(51) Int. Cl.⁷ ............................................... H02P 5/34
(52) U.S. Cl. ...................... 318/801; 318/254; 318/138; 318/439; 318/498; 318/661; 318/638; 318/648
(58) Field of Search ................................. 318/254, 138, 318/439, 798, 815, 661, 638, 648, 801

(56) References Cited

U.S. PATENT DOCUMENTS

| 5,627,758 A | * | 5/1997 | Lansberry et al. .......... 318/254 |
| 5,691,611 A | * | 11/1997 | Kojima et al. .............. 318/254 |
| 5,731,669 A | * | 3/1998 | Shimizu et al. ............. 318/138 |
| 6,191,550 B1 | * | 2/2001 | Yoshihara ................... 318/638 |

FOREIGN PATENT DOCUMENTS

| JP | 61-210889 | 9/1986 |
| JP | 3-46530 | 2/1991 |
| JP | 5-322598 | 12/1993 |
| JP | 8-210874 | 8/1996 |
| JP | 9-72758 | 3/1997 |

* cited by examiner

Primary Examiner—Karen Masih
(74) Attorney, Agent, or Firm—Crowell & Moring LLP

(57) ABSTRACT

An object of the present invention is to provide a motor control system comprising an R/D converter which is capable of outputting a good phase signal without being affected by the switching noise due to a PWM signal of an inverter and a motor control method.

A motor control system comprising a motor 3 having a resolver 8 as a rotary sensor; an inverter 10 for driving the motor; and a control unit 11 for controlling the inverter, the control unit executing phase calculation processing based on a phase signal which is an output of the resolver converted by an R/D converter 15, calculating a voltage reference based on a current reference and a current value of the motor detected by a current sensor 12, generating a PWM signal for controlling the inverter based on the voltage reference, wherein a PWM synchronism signal 212 in synchronism with the PWM signal is generated in the control unit, and the R/D converter 15 is driven using the PWM synchronism signal.

14 Claims, 10 Drawing Sheets

MOTOR CONTROL SYSTEM AND MOTOR CONTROL METHOD

BACKGROUND OF THE INVENTION

1. Field of the Invention

The present invention relates to a motor control system and a motor control method and, more particularly a motor control system and a motor control method using a resolver.

2. Description of Related Art

In an electric vehicle, particularly in a hybrid type electric vehicle, a more efficient drive system is required in order to improve the driving range. Therefore, a synchronous machine such as a synchronous motor or a synchronous generator using permanent magnets come to be widely used instead of a heavy-duty induction motor.

In order to control the motor of these kind, a rotary sensor for detecting a pole position is necessary. The rotary sensors can be roughly classified into an optical type and a resolver type. As an example of the resolver type rotary sensor, Japanese Patent Application Laid-Open No.9-72758 discloses a winding break detecting system including a resolver and an R/D converter and a method of detecting a winding break.

On the other hand, in the hybrid type electric vehicle, a motor and a transmission mechanism of an engine are required to be made small in size and light in weight by integrating them in a unit.

In this case, although the rotary sensor for detecting the magnetic pole position of the motor is also arranged at a position near the engine together with the transmission mechanism, the position is not a desirable environment for the rotary sensor because it is an oil mist producing environment. Therefore, in the electric vehicle employing a hybrid system as the driving method, the resolver type rotary sensor is more suitable than the optical type rotary sensor.

Inventions of using a resolver as a rotary sensor are disclosed in Japanese Patent Application Laid-Open No.5-322598 and Japanese Patent Application Laid-Open No.61-210889. The invention of Japanese Patent Application Laid-Open No.5-322598 is that an R/D converter is operated in synchronism with position control calculation. The invention of Japanese Patent Application Laid-Open No. 61-210889 is that in a resolver of 2-phase exciting 1-phase output type, a PWM signal is generated in synchronism with the output signal.

In the conventional resolver type rotary sensor, a phase error sometimes occurs because the rotary sensor is affected by the switching noise due to the PWM signal of the inverter when current of the motor is changed.

When a phase error occurs in an output of the R/D converter due to the noise, disturbance occurs in the winding current of the motor. This disturbance in the winding current causes occurrence of noise and deterioration of the control characteristic of the electric vehicle.

On the other hand, in the invention of Japanese Patent Application Laid-Open No.61-210889, an angle of rotating $\theta$ is detected from a phase difference between an exciting signal and an output signal in a 2-phase exciting 1-phase output type resolver. Further, The PWM signal is generated completely in synchronism with the cycle of the detected signal. The inverter generates switching noise at an ON-OFF timing of the PWM signal, that is, at a switching timing of the power element. Since the phase detecting timing, that is, the zero-cross point of the output signal, therefore, always agree with the ON-OFF timing of the PWM signal, the detected signal is apt to be affected by the switching noise.

SUMMARY OF THE INVENTION

An object of the present invention is to provide a motor control system comprising an R/D converter which is capable of outputting a good phase signal without being affected by the switching noise due to a PWM signal of an inverter and a motor control method.

This and other objects and advantages are achieved by the motor control system according to the invention in which a motor having a resolver as a rotary sensor is driven by an inverter, which in turn is controlled by a control unit. The control unit executes phase calculation processing, based on a phase signal that is output from the resolver and converted by an R/D converter. A voltage reference is calculated based on current reference and a current value of the motor; and a PWM signal is generated for controlling the inverter based on the voltage reference. The control unit generates a PWM synchronism signal in synchronism with the PWM signal, and the R/D converter is driven using the PWM synchronism signal.

Another feature of the present invention is that the exciting signal of the R/D converter and a starting signal of the A/D converter for acquiring the detected signal of the resolver are synchronized with the PWM synchronism signal.

According to still another feature of the invention, the PWM synchronism signal is synchronized with a timing of a maximum value of or minimum value of a PWM carrier signal.

According to a still further feature of the invention the R/D converter of the control unit includes an exciting signal generating unit for supplying current to an exciting winding of the resolver, and an A/D converter which converts analogue output of a sin-winding and a cos-winding into digital signals. A $\theta$ calculation processing unit calculates tan $\theta$ and cot $\theta$ by a division process, based on the converted digital signal, and calculates a phase angle $\theta_0$ to a rotating angle $\theta$ of the resolver from the tan $\theta$ and cot $\theta$ through a function table. The division process calculates tan $\theta$ and cot $\theta$ using a transfer function $1/(S+KA\cos\theta)$ or $1/(S+KA\sin\theta)$ which uses multiplication processing.

According to the present invention, it is possible to provide a motor control system comprising an R/D converter which is capable of outputting a good phase signal without being affected by the switching noise due to a PWM signal of an inverter and a motor control method.

DESCRIPTION OF THE PREFERRED EMBODIMENTS

Description will be made below on an embodiment of a hybrid type electric vehicle to which the present invention is applied. In general, the hybrid type electric vehicle comprises two kinds of drives, that is, an engine and a permanent magnet type synchronous motor, and these are mounted inside a single engine room. Since the permanent magnet type synchronous motor functions as a generator performing regenerating brake at braking the vehicle, it will be hereinafter referred to simply as a motor. An output shaft of the motor is linked to a wheel shaft through a gear mechanism.

Figure 1:
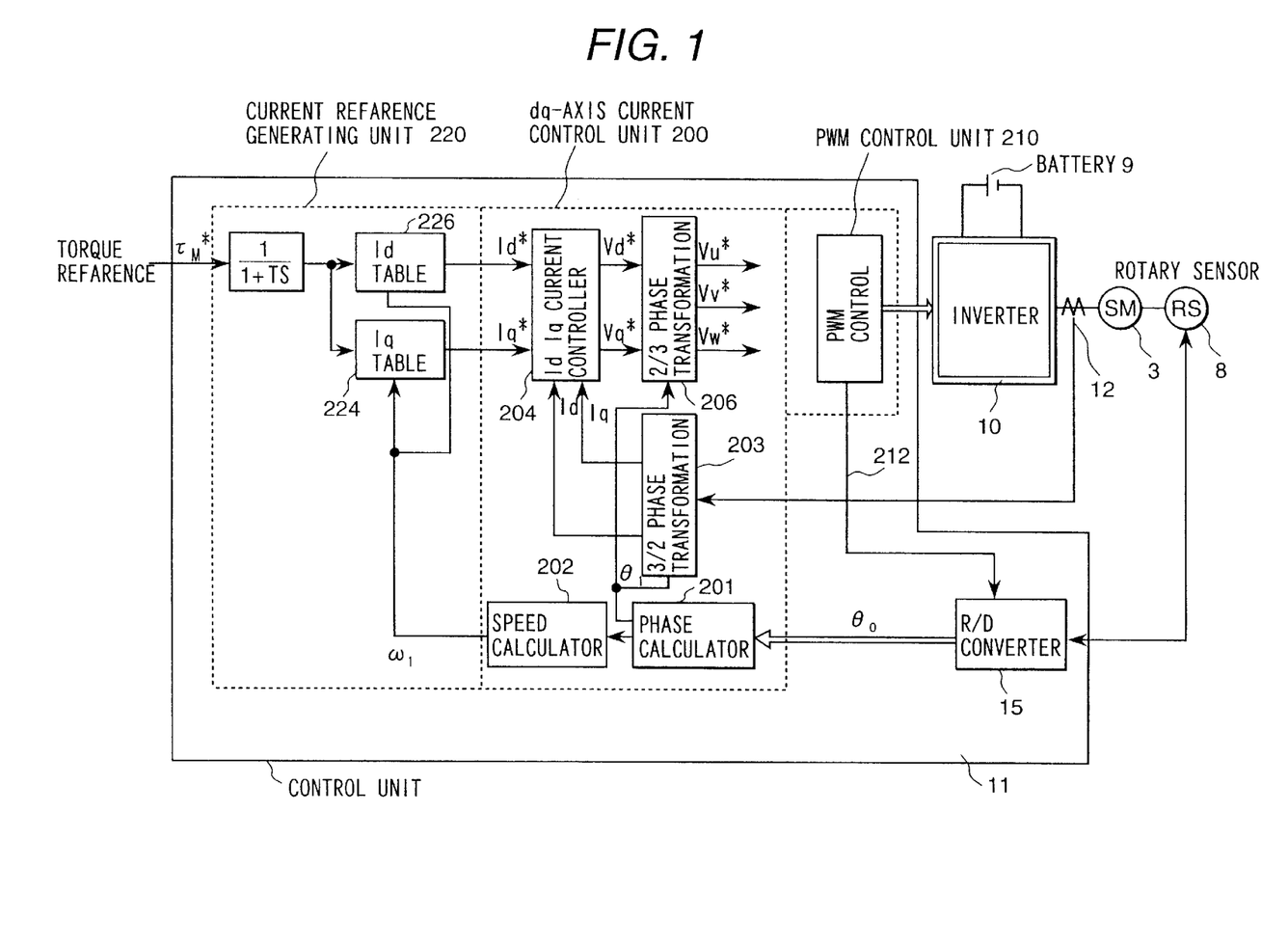
FIG. 1 is a block diagram showing the configuration of an embodiment of a driving system using a resolver for an electric vehicle comprising a permanent magnet type motor in accordance with the present invention.

FIG. 1 shows an example of the configuration of a motor and the motor control system. Referring to the figure, the motor 3 uses a battery 9 as the power source, and is connected to the battery 9 through an inverter 10. The inverter 10 is composed of 6 power elements (IGBT) and diodes each connected to the power element in parallel, and a 3-phase bridge circuit in which currents flowing in the windings of three phases U, V, W of the motor 3 are controlled by a control unit 11, and a smoothing capacitor. The control unit 11 receives a torque reference $\tau M^*$ corresponding to a operation quantity of an accelerator pedal or a brake pedal and controls the inverter 10 so that the motor generates a torque corresponding to the operation quantity.

The reference character 8 indicates a resolver as a rotary sensor for detecting an angle or a magnetic pole position of the motor, and is attached to the output shaft of the motor. The reference character 12 indicates a current sensor for detecting a current flowing in the winding of the motor 3. The reference character 15 indicates an R/D converter which converts a detected signal into a digital signal and calculates a electric phase angle signal (hereinafter referred to as phase angle) $\theta_0$ from a mechanical rotating angle $\theta$.

The control unit 11 comprises a current reference generating unit 220 for calculating current references Iq*, Id* based on the torque reference $\tau M^*$ and a number of rotations $\omega 1$; a dq-axis current control unit 200 for generating a dq-axis reference and an AC voltage reference based on the current references Iq*, Id* and an output of the current sensor 12; and a PWM control unit 210 for generating a PWM signal for controlling the inverter 10 based on the AC voltage reference.

The dq-axis current control unit 20 comprises a phase calculator 201; a speed calculator 202, a 3/2 phase transformation part 203; an Id-Iq current controller 204; and a 2/3 phase transformation part.

In the current reference generating unit 220, the current reference Iq* for the q-axis corresponding to a current of the torque portion is calculated using an Iq table 224 based on the torque reference $\tau M^*$ and the number of rotations $\omega 1$. On the other hand, the current reference Id* for the d-axis is also calculated using an Id table 226 based on the torque reference $\tau M^*$ and the number of rotations $\omega 1$. As described above, based on the torque reference $\tau M^*$ and the number of rotations $\omega 1$, the Iq and the Id tables 224, 226 calculate the current references Iq* and Id* which are required for high-efficient control to minimize the loss.

On the other hand, the phase calculator 201 outputs an phase angle $\theta 1$ by executing unit conversion processing of a phase angle $\theta_0$ of an output of the R/D converter 15 which executes conversion processing of an output of the resolver. The phase angle $\theta 1$ is used in coordinate transformation processing of the 3/2 phase transformation part r 203 and the 2/3 phase transformation part 206.

The 3/2 phase transformation part 203 calculates the d-, q-axis currents Id, Iq by executing 3/2 phase coordinate transformation processing to 3-phase AC current of an motor current detected by the current sensor 12. Based on the values Id, Iq and the references Id*, Iq* calculated by the current reference generating unit 220, the Id-Iq current control unit 204 calculates voltage reference values Vd*, Vq* by executing proportional or proportional-integrating current control processing.

Further, the 2/3 phase transformation part 206 calculates 3-phase AC voltage references Vu*, Vv*, Vw* by executing 2/3 phase coordinate transformation processing to the voltage references Vd*, Vq*.

The PWM control unit 210 generates PWM signals U, V, W by executing comparison processing of the AC voltage references Vu*, Vv*, Vw* with a carrier signal of triangle wave to drive the inverter 10. Further, a PWM synchronism signal 212 in synchronism with the carrier signal of the PWM signal is transmitted from the PWM control unit 210 to the R/D converter 15.

Figure 2:
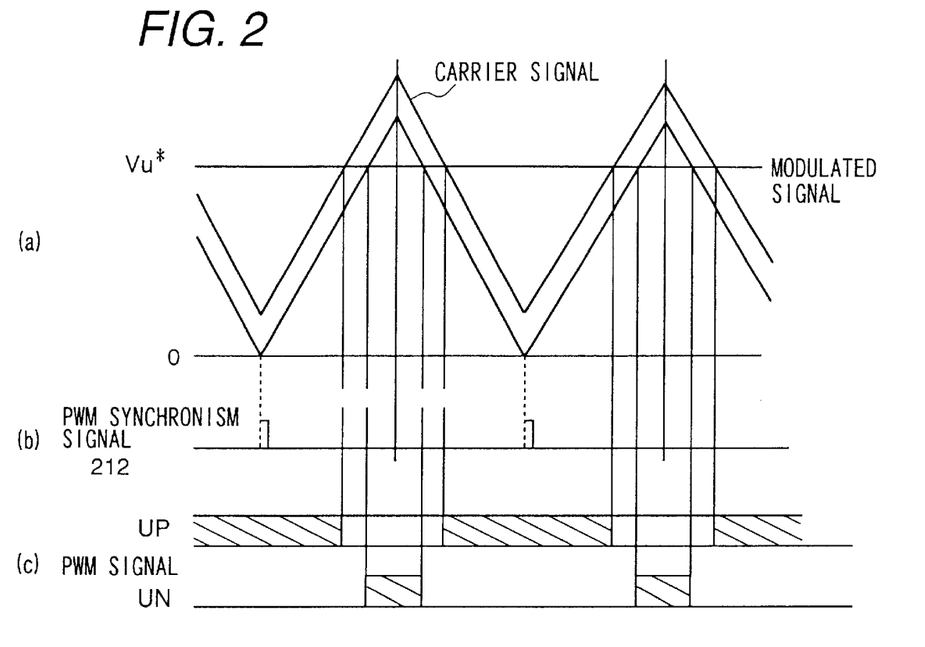
FIG. 2 is a chart explaining a PWM synchronism signal og FIG. 1.

FIG. 2 shows an example of the PWM synchronism signal 212. FIG. 2 (a) shows the waveforms of the triangle wave-shaped carrier signal generated in the PWM signal generating unit 210 and the AC voltage reference Vu* (modulated wave), and (b) shows the waveform of the PWM synchronism signal 212, and (c) shows the waveform of the PWM signal. The PWM synchronism signal 212 is at the timing of the maximum value or the minimum value of the carrier signal.

The control unit 11 controls the PWM controlled voltage applied to the motor 3 so that current of the motor 3 agrees with the current references Iq*, Id*, and the motor 3 is controlled at a high efficiency and minimum loss condition so as to output a torque corresponding to the torque reference $\tau M^*$.

The dq-axis current control unit 200, the PWM control unit 210 and the current reference generating unit 200 of the control unit 11 are constructed by a microcomputer including programs stored in a memory ROM, a CPU for reading the program and executing appropriate processing according to the procedure of the program, a memory RAM for storing the programs and functions, constants and data necessary for executing the processing. Further, the microcomputer has functions necessary for executing the processing of each of the above-described parts such as the calculating function and the A/D conversion function described above.

Figure 3:
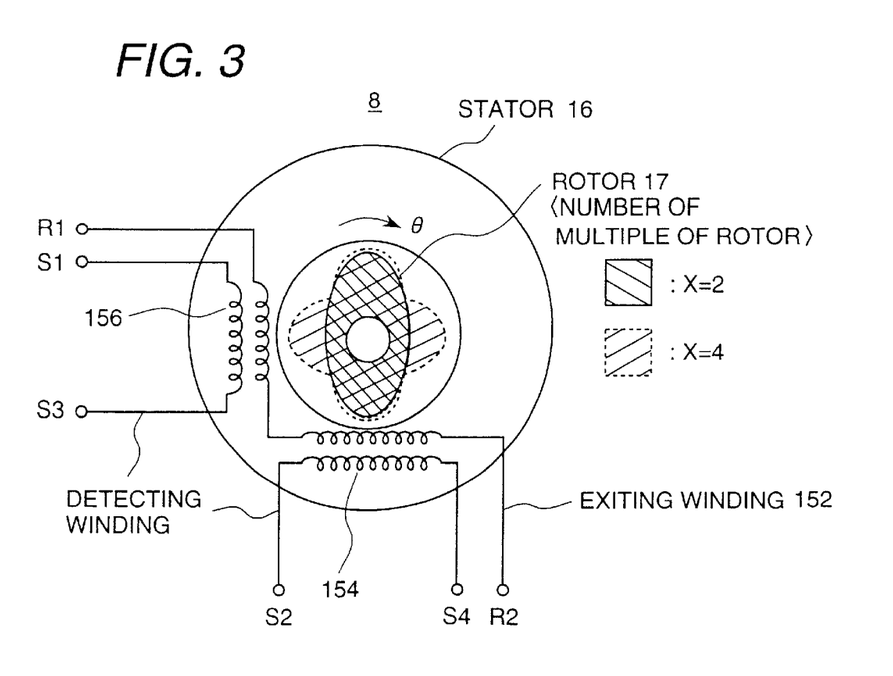
FIG. 3 is a diagram explaining the main unit of the resolver of FIG. 1.

FIG. 3 shows the construction of an example of the resolver 8. The main body of the resolver 8 has a stator 16 and a rotor 17 fixed to the output shaft of the motor 3, and an exciting winding 152, a sin winding 154 and a cos winding 156 are provided in the stator 16. FIG. 3 shows a case where the number of multiple X is 2 or 4.

Figure 4:
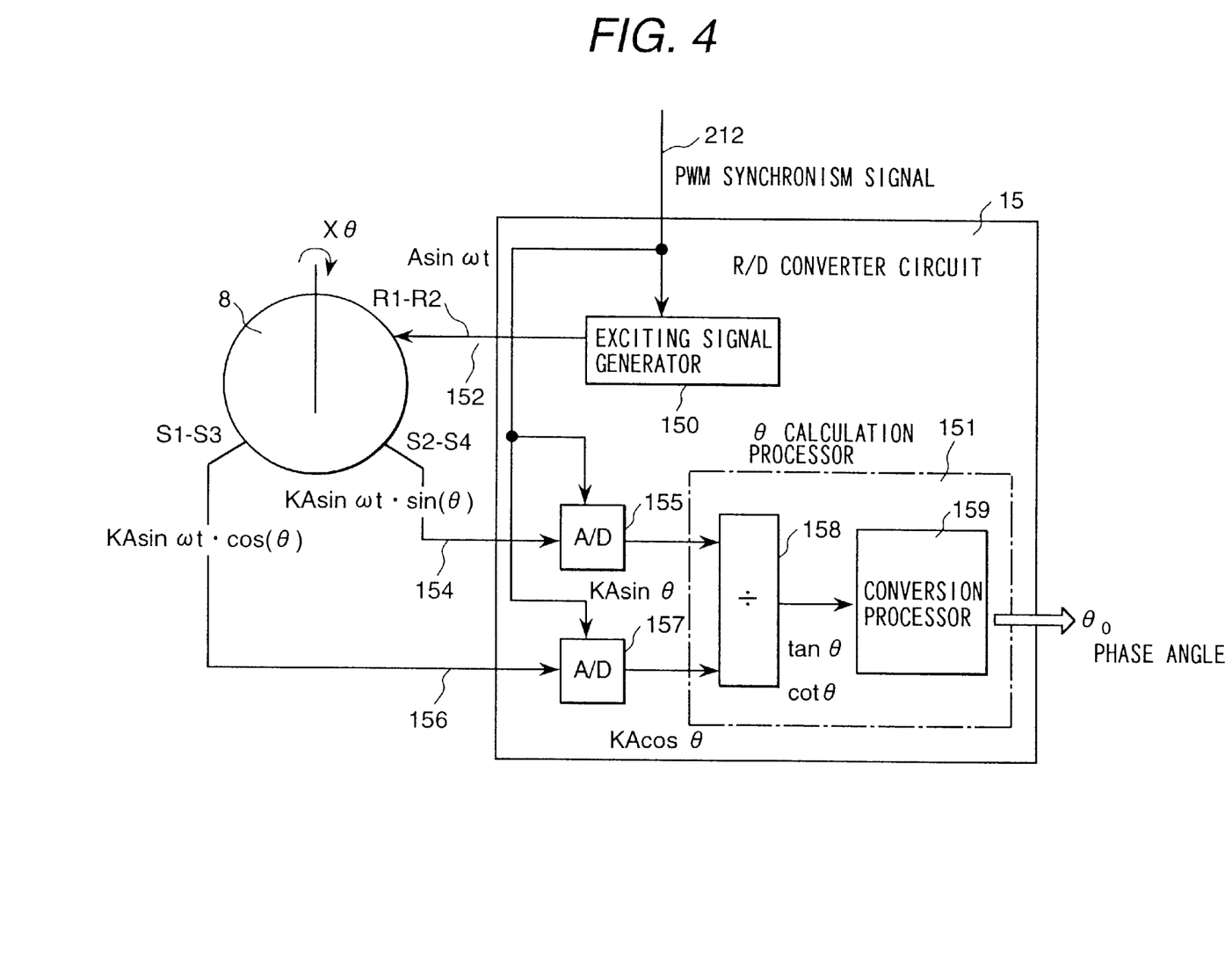
FIG. 4 is a block diagram showing an example of the configuration of the R/D converter of FIG. 1.
Figure 5:
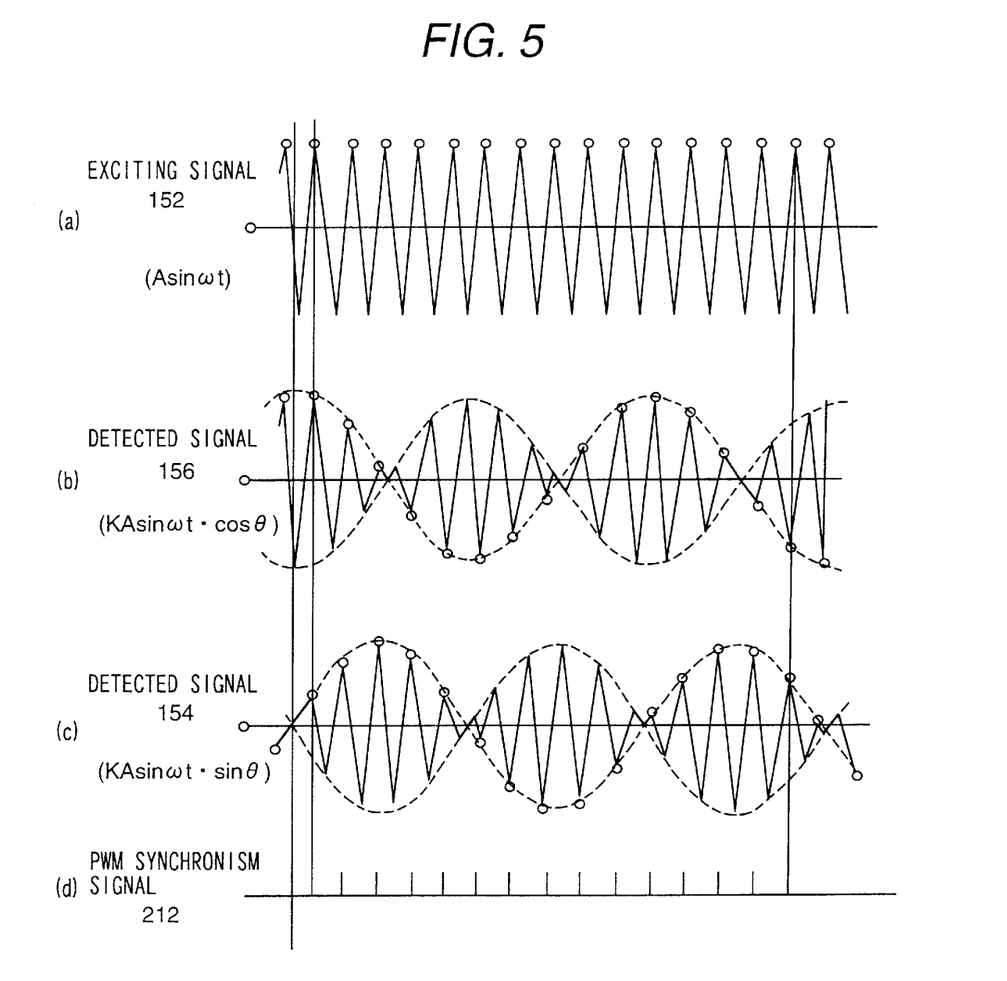
FIG. 5 is a chart showing the relationship among an exciting signal, a detected signal and a PWM synchronism signal.

FIG. 4 is a block diagram showing an R/D converter 15 for converting a signal of the resolver 8 into a digital signal to output a phase angle $\theta_0$ which characterizes the present invention. FIG. 5 shows the relationship between detected signal and PWM synchronism signal.

The R/D converter 15 comprises an exciting signal generator 150 for supplying current to the exciting winding 152 of the resolver 8; A/D converters 155, 157 for converting analogue signals of the sin winding 154 and the cos winding 156 of the resolver 8 into digital signals; and a $\theta$ calculation processor 151 for calculating a phase angle $\theta_0$ corresponding to a rotating angle $\theta$ of the resolver from the converted digital signals. The $\theta$ calculation processor 151 is composed of a divider 158 and a conversion processor 159. The exciting signal generator 150 and the A/D converters 155, 157 are driven in synchronism with the PWM synchronism signal 212 in synchronism with the carrier signal of the PWM signal.

The exciting signal of $A \cdot \sin \omega t$ is supplied from the exciting signal generator 150 between terminals R1–R2 of the exciting winding 152 of the resolver 8. The exciting signal generator 150 generates the exciting signal shown in FIG. 5 (a) from the PWM synchronism signal 212 at the timing of the maximum value of the carrier signal of the PWM control. Although the exciting signal is a sin wave signal expressed by $A \sin \omega t$, it may be a triangle wave as shown in the figure in order to simplify a forming processing means.

The sin winding 154 and the cos winding 156 of the resolver 8 are connected between terminals S2–S4 and terminals S1–S3, respectively, and a signal generated between the terminals S2–S4 is input to the A/D converter 155 and a signal generated between the terminals S1–S3 is input to the A/D converter 157. When the exciting signal is $A \cdot \sin \omega t$, a signal expressed by $K \cdot A \cdot \sin \omega t \cdot \sin \theta$ and a signal expressed by $K \cdot A \cdot \sin \omega t \cdot \cos \theta$ are output as the detected signals 154, 156. Therein, K is a transforming ratio. In the present invention, the case of the number of multiple X=1 will be described.

The detected signal has an amplitude modulated waveform of the exciting signal corresponding to the rotating angle $\theta$ of the rotor as shown in FIG. 5 (b) and (c). That is, since X=1, both of the mechanical angle $\theta$ and the phase angle $\theta_0$ for 1 rotation are 360 degrees. Therein, in a case of X=2, $\theta$=360 degrees and $\theta_0$ is 360 degrees X 2, that is, 2 cycles.

The A/D converters 155, 157 are started in synchronism with the PWM synchronism signal 212 shown in FIG. 5 (d), that is, at the timing of the maximum value of the exciting signal 152. By starting at such a timing, the A/D converter 155 outputs a digital signal of $K \cdot A \cdot \sin \theta$ and the A/D converter 157 outputs a digital signal of $K \cdot A \cdot \cos \theta$. The outputs of A/D converters 155, 157 are processed by the division processor 158 of the $\theta$ calculation processor 151 to output $\tan \theta$ and $\cot \theta$.

Figure 6:
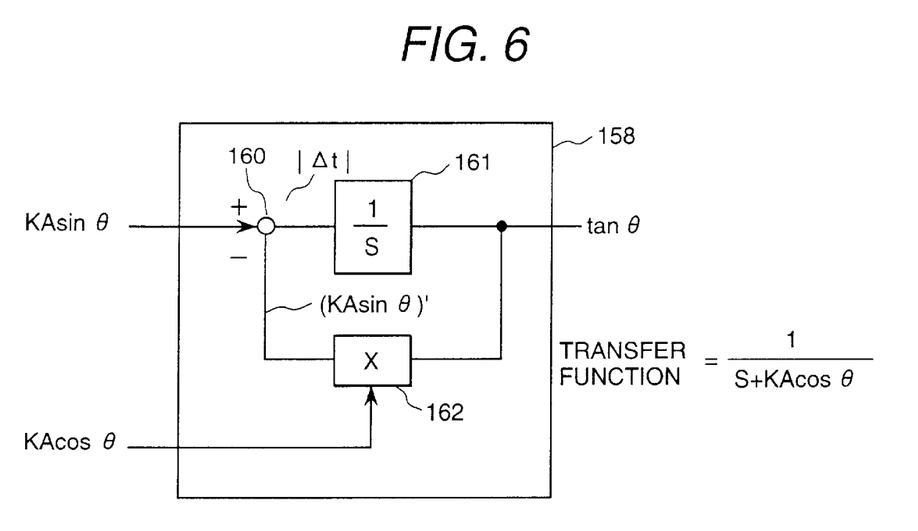
FIG. 6 is a diagram showing the processing block of the division processing unit 158 in the R/D conversion unit.

FIG. 6 shows a $\tan \theta$ processing block of the division processor 158 in the R/D converter 15. The division processor 158 is composed of an adder 160, an integrator 161 and a multiplier 162, and calculates $\tan \theta$ using a transfer function $1/(S+KA \cos \theta)$ which uses multiplication processing.

Figure 7:
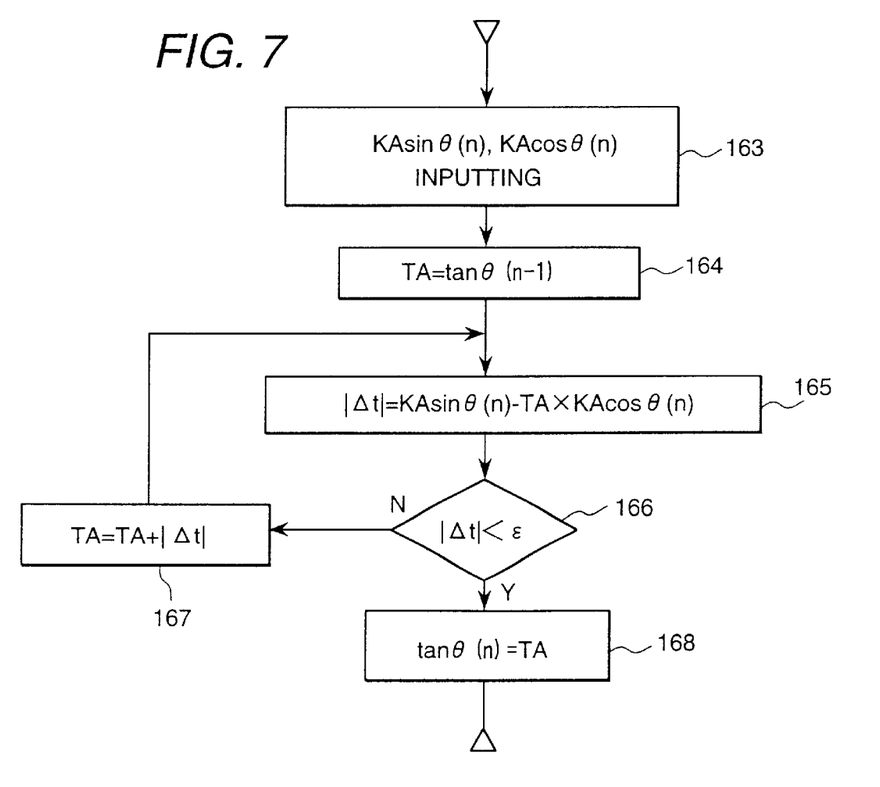
FIG. 7 is a flowchart showing the processing for calculating tan $\theta$ using a transfer function $1/(S+KA\cos\theta)$.

When $\tan \theta$ is calculated simply by division processing of ($KA \sin \theta \div KA \cos \theta$) using a dividing command of a microcomputer, overflow processing is required when the denominator is zero. Therefore, in the present invention, such processing is not required because $\tan \theta$ is calculated using the transfer function $1/(S+KA \cos \theta)$ which uses the multiplication processing, as shown in FIG. 6. FIG. 7 is a flowchart showing the processing for calculating $\tan \theta$ using the transfer function $1/(S+KA \cos \theta)$.

Referring to FIG. 7, KA sin $\theta(n)$ and KA cos $\theta(n)$ are initially input (Step 163). Next, a value $\tan \theta$ in the preceding time, that is, $\tan \theta(n-1)$ is read, and it is set that TA=tan $\theta(n-1)$ (Step 164). Further, a difference $|\Delta t|$ in this time, that is, $|\Delta t|(n)$ is calculated using the following equation (Step 165).

$$|\Delta t| = KA \sin \theta(n) - TA \times KA \cos \theta(n)$$

Next, the difference $|\Delta t|$ is compared with a target value $\epsilon$ (Step 166). If $|\Delta t|$ is smaller than $\epsilon$, the processing is completed by setting $\tan \theta(n)$=TA (Step 168). If $|\Delta t|$ is larger than $\epsilon$, the processing is returned to Step 165 by setting TA=TA+$|\Delta t|$ (Step 167).

The difference $|\Delta t|$ can be converged on $\epsilon$ by executing the converging calculation of Steps 165, 166, 167 several iterations within the control sampling time period of the dq-axis current control unit. It is preferable that cycles of the control sampling, the PWM carrier signal and the exciting signal of the resolver are the same timing and the same cycle. However, the cycle of the exciting signal may be an integer fraction of the control sampling cycle.

When the difference $|\Delta t|$ does not converge on the target value $\epsilon$ even if the comparing steps are repeated several iterations within a control sampling time period, necessary measures are performed by judging that the resolver is in an abnormal state.

The calculated $\tan \theta$ has a very large value at points near the electric angles of 90 degrees, 270 degrees. Therefore, if the dynamic range is adjusted to the large numerical value in the microcomputer, the phase angle $\theta$ can not be detected in a sufficient accuracy when $\tan \theta$ is a small numerical value at the electric angle below 45 degrees. In order to secure the accuracy of the phase angle $\theta 0$, the cotangent value $\cot \theta$ is also calculated in addition to the tangent value $\tan \theta$.

Calculation processing of the cotangent value $\cot \theta$ can be executed as follows. That is, in FIG. 6, the cotangent value $\cot \theta$ can be obtained as an output of the integrator 161 by changing the input to the adder 160 from KA sin $\theta$ to KA cos $\theta$ and changing the input to the multiplier 162 from KA cos $\theta$ to KA sin $\theta$.

On the other hand, in the processing flow of FIG. 7, the calculation processing of the cotangent value $\cot \theta$ can be executed by replacing the processing in Step 164 by TA=cot $\theta(n-1)$, the processing in Step 165 by $|\Delta c|$=KA sin $\theta(n)$−TA×KA cos $\theta(n)$, and the processing in Step 168 by cot $\theta(n)$=TA.

Figure 8:
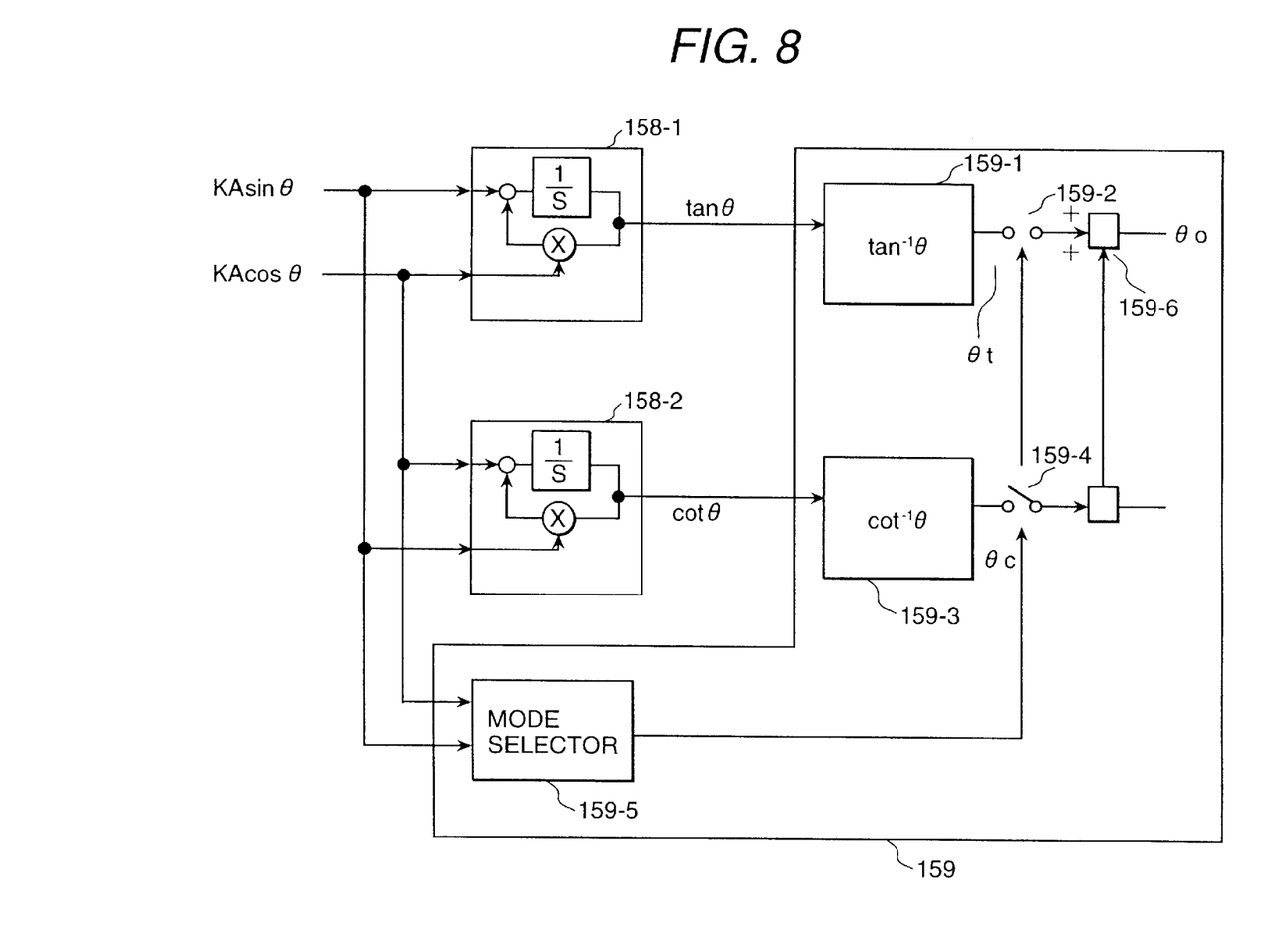
FIG. 8 is a diagram showing the processing block of the conversion processing unit 159.
Figure 9:
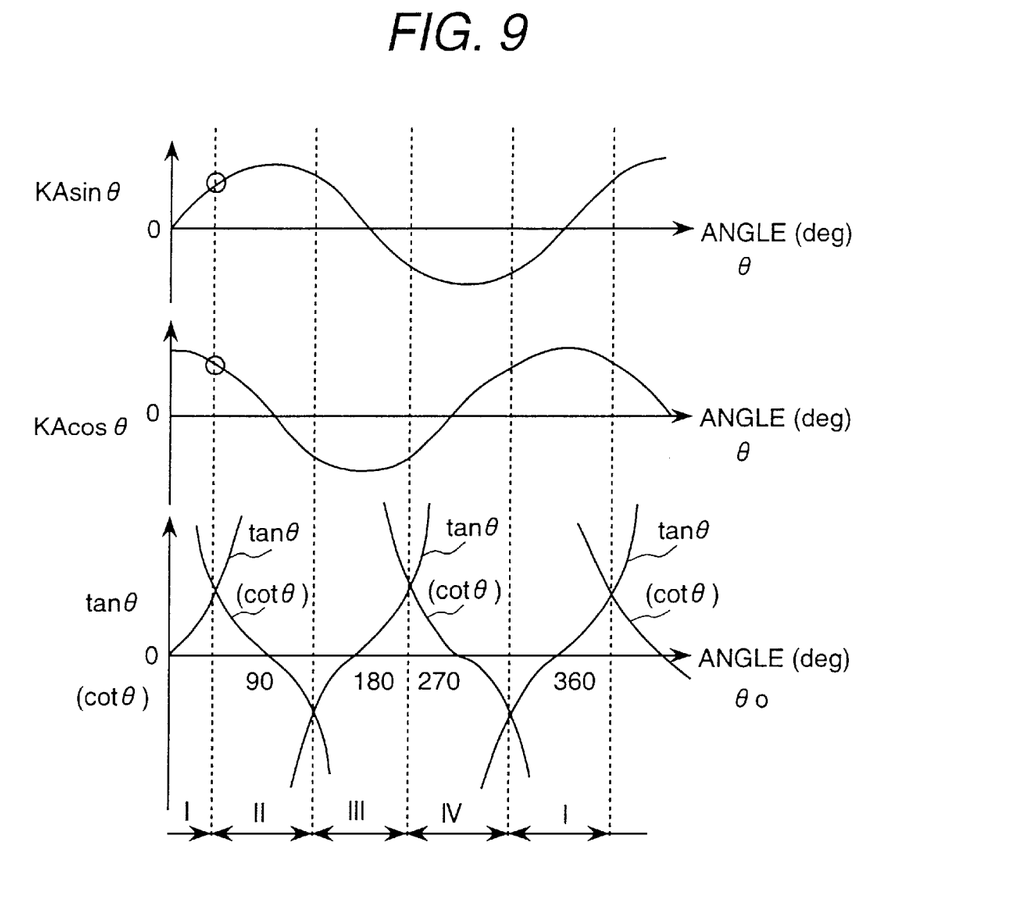
FIG. 9 is a chart showing the converting characteristic of trigonometric functions for explaining operation of the conversion processing unit 159.

Next, the phase angle $\theta_0$ can be obtained by executing conversion processing using the conversion table in the conversion processor 159 based on the output $\tan \theta$ of the division processor 158. FIG. 8 is a block diagram showing the processing of the conversion processor 159, and FIG. 9 is a conversion characteristic chart of trigonometric functions explaining the operation of the conversion processor.

Referring to FIG. 8, the tangent value $\tan \theta$ obtained from the division processor 158-1 and the cotangent value $\cot \theta$ obtained from the division processor 158-2 are input to the conversion processor 159. In the calculator 159-1, a phase angle $\theta t$ corresponding to the tangent value $\tan \theta$ is obtained from the tangent value $\tan \theta$ using a conversion table of $\tan^{-1} \theta$, and in the calculator 159-3, a phase angle $\theta c$ corresponding to the cotangent value $\cot \theta$ is obtained from the cotangent value $\cot \theta$ using a conversion table of $\cot^{-1} \theta$.

The outputs θt and θc of the calculators 159-1 and 159-3 are selected by switches 159-2, 159-4 driven by a mode selector 159-5 to be output as the phase angle $θ_0$. The mode selector 159-5 judges which period of the periods I to IV in FIG. 9 the input signals KA sin θ, KA cos θ of the division processors 158-1, 158-2 exist in, and operates the switches 159-2 and 159-4 so that the following calculation processing may be executed in each period.

That is, when θt and θc are input to a processor 159-6, the following processing is executed. Therein, tan θ and cot θ in the following calculation equations are input values to the conversion processor 159.

Period I: phase angle $θ_0 = \tan^{-1} θ(\tan θ) = θt$
Period II: phase angle $θ_0 = \cot^{-1} θ(\cot θ) = θc$
Period III: phase angle $θ_0 = 180° + \tan^{-1} θ(\tan θ) = 180° + θt$
Period IV: phase angle $θ_0 = 180° + \cot^{-1} θ(\cot θ) = 180° + θc$ According to the present invention, a good phase angle $θ_0$ can be output as an output of the R/D converter 15 without being affected by the switching noise by the PWM signal of the inverter. In regard to the point that the output of the R/D converter 15 in accordance with the present invention is not affected by the switching noise, description will be made below, referring to FIG. 10 and FIG. 11.

Figure 10:
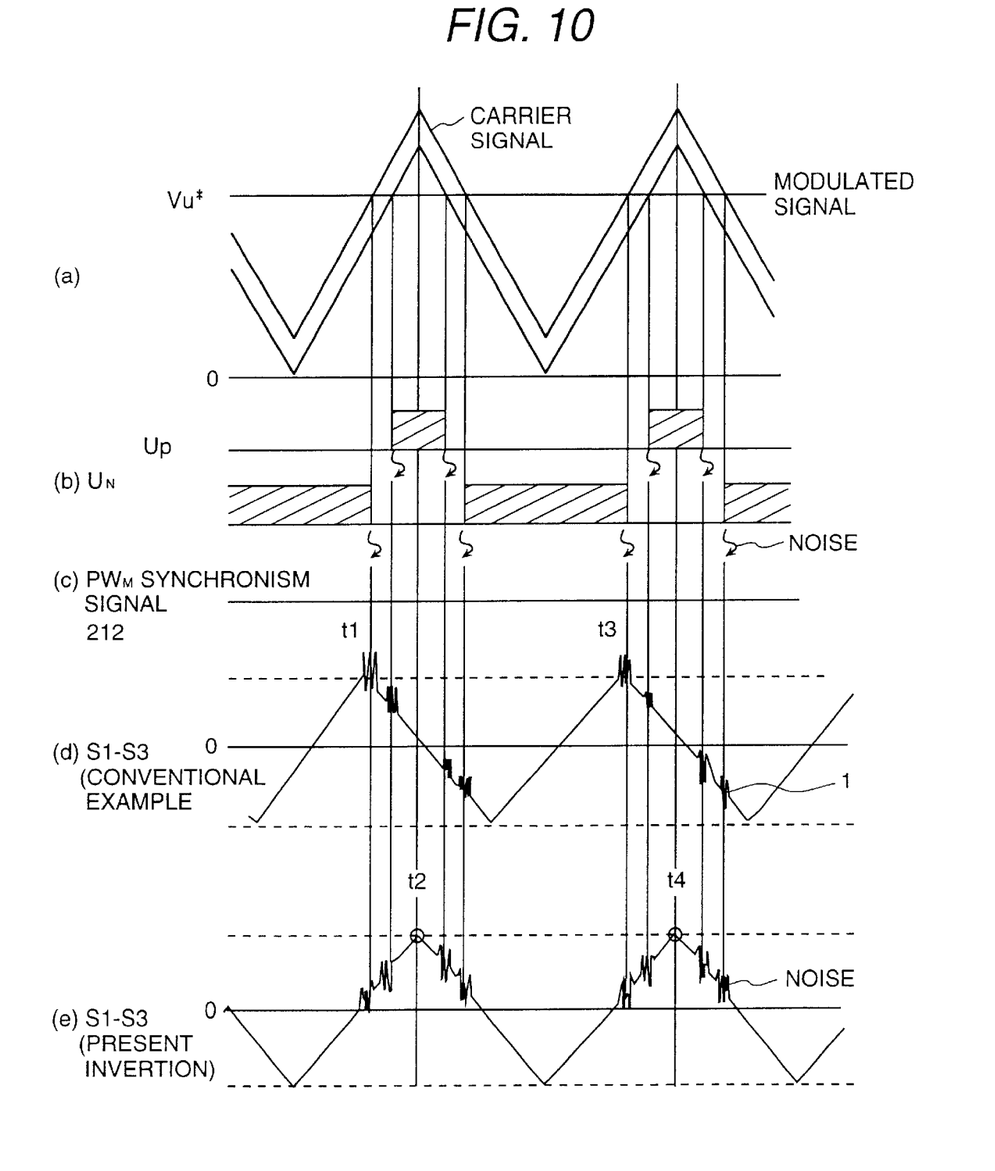
FIG. 10 is a chart showing the relationship between a PWM signal and a signal which is produced between terminals S1 and S3 and input to the R/D converter 15.

FIG. 10 is a chart showing the relationship between a PWM signal and a signal which is produced between terminals S1 and S3 and input to the R/D converter.

FIG. 10 (a) shows the triangle wave-shaped carrier signal generated inside the PWM signal generating unit 210 and the waveform of the modulated signal of the AC voltage reference value Vu*. FIG. 10 (b) shows PWM signals of power elements UP (P side) and UN (N side) of the inverter, and (c) shows the PWM synchronous signal 212. FIG. 10 (d) shows a detected signal generated between the terminals S1–S3 and acquired by the R/D converter 15 in a conventional example. FIG. 10 (e) shows a detected signal generated between the terminals S1–S3 and acquired by the R/D converter 15 in the present invention.

Therein, the conventional example (d) means a case where the phase angle $θ_0$ is calculated by an R/D converter out of synchronism with the PWM signal.

As shown in FIG. 10 (b), noise is generated at each of the ON-OFF timings of the PWM signals of power elements UP (P side) and UN (N side), that is, at each of the timings of rising and falling of the UP and the UN. In the conventional example out of synchronism with the PWM signal 212, the acquiring timing (t1, t3 and so on) of the detected signal generated between the terminals S1–S3 is overlapped with the time period of occurrence of the noise, the output of the R/D converter 15 is affected by the noise, and accordingly a phase error sometimes occurs.

On the other hand, in the case of the present invention, acquiring of the detected signal generated between the terminals S1–S3 is performed at the timing of t2, t4 completely in synchronism with the PWM synchronism signal 212, as shown in FIG. 10 (e). The PWM synchronism signal 212 is set to at the timing of the peak point of the carrier signal, that is, at the timing when there is no rising and falling of the UP and UN. Therefore, according to the present invention, the R/D converter 15 can calculate a phase angle $θ_0$ from the good detected signal without being affected by the switching noise by the PWM signal of the inverter.

Figure 11:
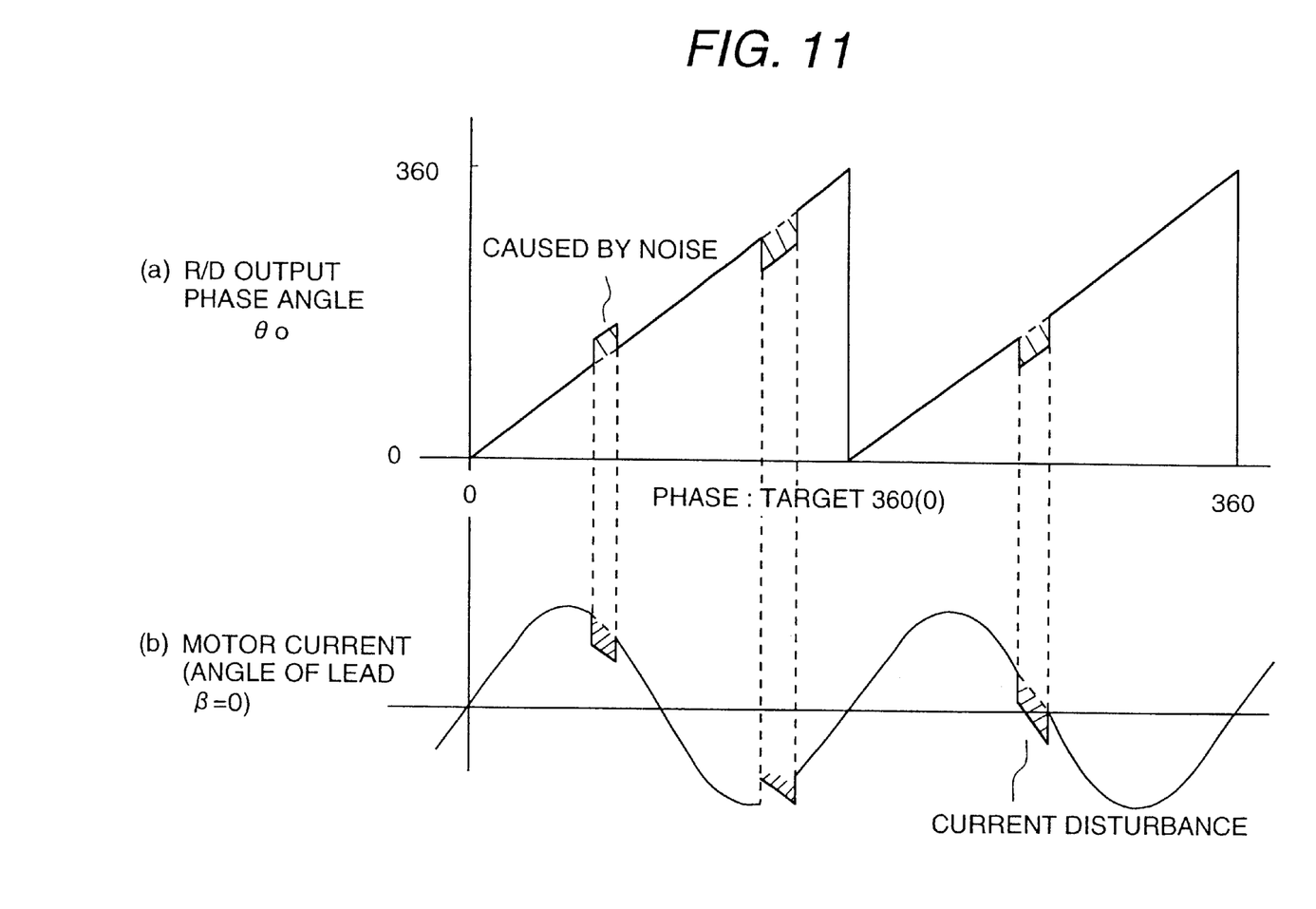
FIG. 11 is a chart showing the relationship between phase angle $\theta_0$ of an output of the R/D converter and current flowing in U-phase winding of the motor.

FIG. 11 is a chart showing the relationship between phase angle $θ_0$ of an output of the R/D converter and current flowing in U-phase winding of the motor. When a phase error occurs in the output of the R/D converter 15 by the effect of noise because being out of synchronism with the PWM synchronism signal 212 as in the conventional example, disturbance occurs in the winding current of the motor. The disturbance in the winding current causes occurrence of noise and deterioration of the control performance.

Figure 12:
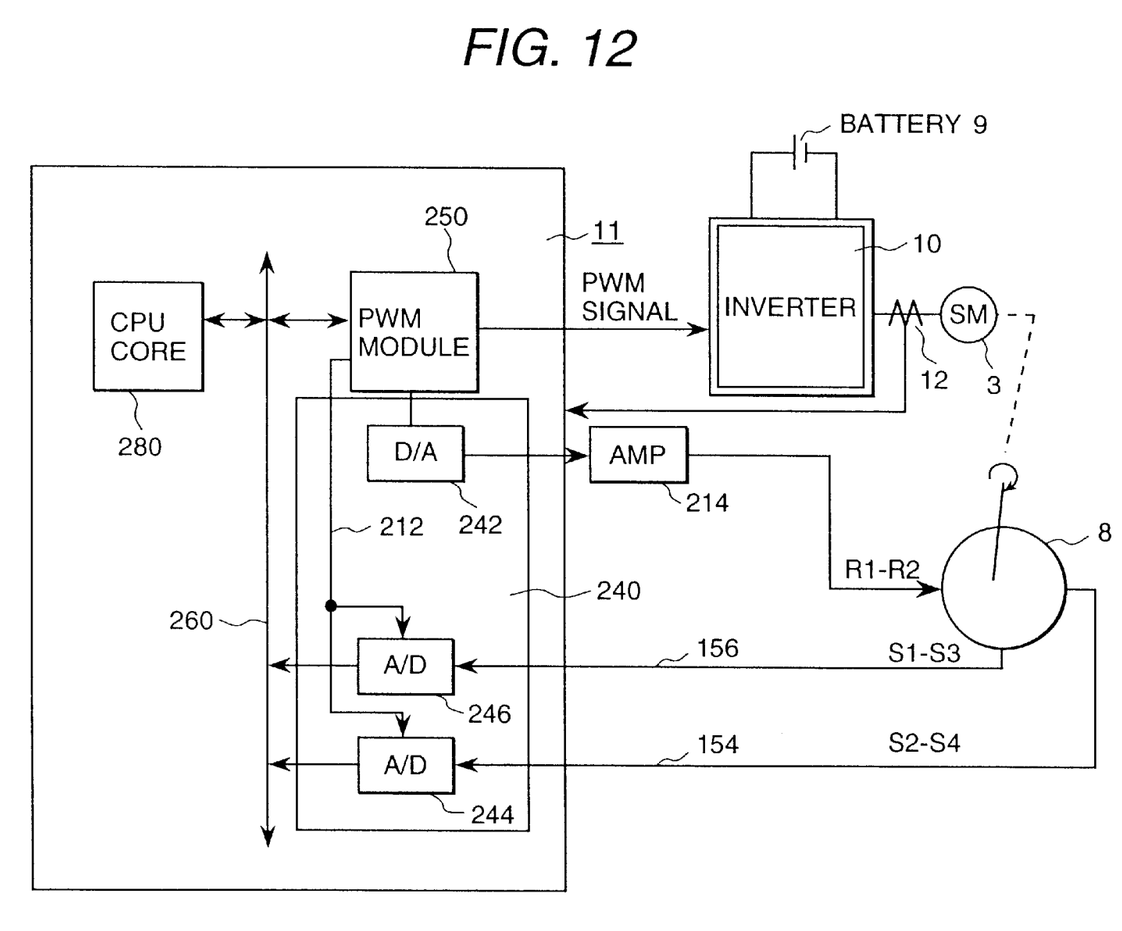
FIG. 12 is a block diagram explaining another embodiment of an R/D converter in accordance with the present invention.

FIG. 12 is a block diagram explaining another embodiment of an R/D converter 15 in accordance with the present invention. In this embodiment, part of the functions of the R/D converter 15 described above is processed by software in the control unit 11.

The R/D converter 240 obtains an exciting signal by performing D/A conversion of the PWN carrier signal 212 generated by a PWM module 250, and comprises a D/A converter 242 for supplying the exciting signal to the exciting winding 152 of the resolver 8 through an amplifier 214; and A/D converters 244, 246 for converting analogue outputs of the sin winding 154 and the cos winding 156 of the resolver 8 into digital signals.

Instead of the A/D converter 242, it is possible that a dedicated exciting signal generating circuit using another PWM synchronism signal which changes at the timings of the maximum value and the minimum value of the carrier signal of FIG. 2 output from the PWM module 250.

In addition to the above, the processing of the θ calculation processor 248 shown in FIG. 4 is executed by the CPU 280. That is, the processing to calculat the phase angle $θ_0$ corresponding to the rotating angle of the resolver 8 from the input digital signal is executed according to a processing procedure of software in the CPU 280.

The A/D converters 244, 246 are driven in synchronism with the PWM synchronism sigal 212 generated by the PWM module 250. The digital data converted by the A/D converters is software-processed by the CPU 280 using a bus 260 inside the microcomputer.

The detected signals 154, 156 are positive and negative polar modulated signals. If the A/D converters 244, 246 are of a single polar input, absolute value circuits (external circuits) and twice as many as A/D converters are necessary.

In the present embodiment similarly to the above0mentioned embodiment, since the output signal generated between the terminals S1–S3 is acquired completely in synchronism with the PWM synchronism signal 212 and A/D converted to be processed, a good phase signal without being affected by the switching noise by the PWM signal of the inverter can be obtained. Further, since the A/D converted digital data is transmitted using the bus 260 inside the microcomputer and processed by software, the data is not affected by external noise and accordingly the reliability can be improved.

According to the above, it is possible to provide a motor control system comprising an R/D converter which is capable of outputting a good phase signal without being affected by the switching noise due to a PWM signal of an inverter and a motor control method.

What is claimed is:

1. A motor control system comprising a motor having a resolver as a rotary sensor; an inverter for driving said motor; and a control unit for controlling said inverter, said control unit executing phase calculation processing based on a phase signal which is an output of said resolver converted by an R/D converter; calculating a voltage reference based on a current reference and a current value of said motor; generating a PWM signal for controlling said inverter based on said voltage reference, wherein a PWM synchronism signal in synchronism with said PWM signal is generated in said control unit, and said R/D converter is driven using said PWM synchronism signal.

2. A motor control system according to claim 1, wherein the exciting signal of said R/D converter and a starting signal of said A/D converter for acquiring the detected signal of said resolver are synchronized with said PWM synchronism signal.

3. A motor control system according to claim 1, wherein said PWM synchronism signal is synchronized with a timing of a maximum value or a minimum value of a PWM carrier signal.

4. A motor control system according to claim 1, wherein an exciting signal of said resolver and a PWM carrier signal are used in common, and said PWM carrier signal is amplified to form the exciting signal of said resolver.

5. A motor control system according to claim 1, wherein said R/D converter of said control unit converts analogue outputs of a sin-winding and a cos-winding of the resolver into digital signals in synchronism with said PWM synchronism signal in said A/D converter, and calculates a phase angle $\theta_0$ to a rotating angle $\theta$ of said resolver from said A/D converted signal in a $\theta$ calculating unit.

6. A motor control system according to claim 5, wherein the function of said R/D converter is installed in a microcomputer composing said control unit, the detected signal of said resolver being acquired by said A/D converter in synchronism with said PWM carrier signal or said exciting signal, $\theta$ calculation processing of a converted value of said A/D converter being executed by software through an internal bus of said microcomputer.

7. A motor control system according claim 1, wherein said R/D converter of said control unit comprises an exciting signal generating unit for supplying current to an exciting winding of said resolver; an A/D converter for converting analogue outputs of a sin-winding and a cos-winding into digital signals; and a $\theta$ calculation processing unit for executing division processing to obtain tan $\theta$ and cot $\theta$ from the converted digital signal and calculating a phase angle $\theta_0$ to a rotating angle $\theta$ of said resolver from the tan $\theta$ and cot $\theta$ through a function table, wherein said division processing calculates tan $\theta$ and cot $\theta$ using a transfer function 1/(S+KA cos $\theta$) or 1/(S+KA sin $\theta$) which uses multiplication processing.

8. An electric vehicle control system according to claim 1, wherein said motor is a permanent magnet type motor.

9. A motor control method using a motor control system which comprises a motor having a resolver as a rotary sensor; an inverter for driving said motor; and a control unit for controlling said inverter, the method comprising the steps of:

executing phase calculation processing based on a phase $\theta_0$ which is an output of said resolver converted by an R/D converter;

calculating a voltage reference based on a current reference and a current value of said motor;

generating a PWM signal for controlling said inverter based on said voltage reference;

generating a PWM synchronism signal in synchronism with said PWM signal in said control unit, and driving said R/D converter using said PWM synchronism signal;

converting the output of said resolver into a digital signal;

executing division processing to obtain tan $\theta$ cot $\theta$ from the converted digital signal; and calculating a phase angle $\theta_0$ to a rotating angle $\theta$ of said resolver from the tan $\theta$ and cot $\theta$ through a function table.

10. A motor control method according to claim 9, wherein said division processing calculates tan $\theta$ and cot $\theta$ using a transfer function 1/(S+KA cos $\theta$) or 1/(S+KA sin $\theta$) which uses multiplication processing.

11. A motor control method according to claim 10, wherein said division processing comprises the steps of:

acquiring outputs of said A/D converter KA sin $\theta(n)$ and KA cos $\theta(n)$;

in a case of calculating tan $\theta$, reading a value tan $\theta$ in a preceding time, and setting TA=tan $\theta(n-1)$;

calculating $|\Delta t|$=KA sin $\theta(n)$−TA×KA cos $\theta(n)$ to obtain a difference $|\Delta t|$;

comparing the difference $|\Delta t|$ with a target value $\epsilon$, and setting tan $\theta(n)$=TA and completing the processing if $|\Delta t|$ is smaller than $\epsilon$, and again obtaining said difference $|\Delta t|$ by setting TA=TA+$|\Delta t|$ if $|\Delta t|$ is larger than $\epsilon$;

in a case of calculating cot $\theta$, reading a value cot $\theta$ in a preceding step, and setting TA=cot $\theta(n-1)$;

calculating $|\Delta c|$=KA sin $\theta(n)$−TA×KA cos $\theta(n)$ to obtain a difference $|\Delta c|$;

comparing the difference $|\Delta c|$ with the target value $\epsilon$, and setting cot $\theta(n)$=TA and completing the processing if $|\Delta c|$ is smaller than $\epsilon$, and again obtaining said difference $|\Delta c|$ by setting TA=TA+$|\Delta c|$ if $|\Delta c|$ is larger than $\epsilon$; and judging that said resolver is in an abnormal state when said differences $|\Delta t|$, $|\Delta c|$ do not converge on the target value $\epsilon$ even if the comparing steps are repeated several iterations within a control sampling time period.

12. A motor control method according to claim 10, wherein said division processing comprises the steps of:

calculating tan $\theta$ by using KA sin $\theta$ as an input and KA cos $\theta$ as a multiplier of feedback value; and calculating cot $\theta$ by using KA cos $\theta$ as an input and KA sin $\theta$ as a multiplier of feedback value.

13. A motor control system comprising a motor having a resolver as a rotary sensor; an inverter for driving said motor; and a control unit for controlling said inverter, wherein said control unit comprises a current reference generating unit for generating a d-axis current reference and a q-axis current reference; a dq-axis current control unit for calculating AC voltage reference values Vu*, Vv*, Vw* by executing coordinate transformation of dq-axis voltage reference values Vd*, Vq* based on the dq-axis current references and a detected value of dq-axis current from motor current; a PWM control unit for generating a PWM signal for driving said inverter based on said AC voltage reference values; and an R/D converter composed of a phase calculating unit for calculating a phase signal used in the coordinate transformation processing, a speed calculating unit for calculating a speed based on said phase signal, an exciting signal generating unit of said resolver, an A/D converter for acquiring an output of said resolver as a detected signal and a $\theta$ calculation processing unit, wherein a PWM synchronism signal in synchronism with said PWM signal is generated in said control unit, and said R/D converter is driven using said PWM synchronism signal.

14. An electric vehicle control system according to claim 13, wherein said motor is a permanent magnet type motor.

* * * * *